(12) United States Patent
Lashgari

(10) Patent No.: US 7,063,271 B2
(45) Date of Patent: Jun. 20, 2006

(54) MOISTURE RESPONSIVE SPRINKLER CIRCUIT

(76) Inventor: Bijan Lashgari, 7 Earlymorn, Irvine, CA (US) 92614

( * ) Notice: Subject to any disclaimer, the term of this patent is extended or adjusted under 35 U.S.C. 154(b) by 100 days.

(21) Appl. No.: 10/822,875

(22) Filed: Apr. 13, 2004

(65) Prior Publication Data

US 2006/0102740 A1    May 18, 2006

(51) Int. Cl.
*A01B 25/00* (2006.01)
*B05B 27/00* (2006.01)
*B05B 12/08* (2006.01)
*A05B 17/04* (2006.01)

(52) U.S. Cl. ................. 239/64; 63/67; 63/69; 73/304 R
(58) Field of Classification Search ................. 239/63, 239/64, 67; 73/304 R
See application file for complete search history.

(56) References Cited

U.S. PATENT DOCUMENTS

| 3,224,676 | A | * | 12/1965 | Rauchwerger ............. 137/78.2 |
| 4,657,039 | A | | 4/1987 | Bireley |
| 4,693,419 | A | | 9/1987 | Weintraub et al. |
| 4,796,654 | A | | 1/1989 | Simpson |
| 4,801,865 | A | | 1/1989 | Miller et al. |
| 4,838,296 | A | | 6/1989 | Brooks |
| 4,941,501 | A | | 7/1990 | Bireley |
| 5,148,985 | A | * | 9/1992 | Bancroft ..................... 239/64 |
| 5,424,649 | A | | 6/1995 | Gluck et al. |
| 5,445,176 | A | * | 8/1995 | Goff ........................... 137/80 |
| 5,445,178 | A | | 8/1995 | Feuer |
| 5,749,521 | A | | 5/1998 | Lattery |
| 5,813,606 | A | | 9/1998 | Ziff |
| 5,859,536 | A | * | 1/1999 | Stockton .................... 324/664 |
| 6,016,971 | A | * | 1/2000 | Welch et al. ................ 239/63 |
| 6,298,285 | B1 | | 10/2001 | Addink et al. |
| 6,559,659 | B1 | | 5/2003 | Cuming |
| 6,628,501 | B1 | | 9/2003 | Toyoda |
| 6,685,104 | B1 | | 2/2004 | Float et al. |
| 2003/0230638 | A1 | | 12/2003 | Dukes et al. |

* cited by examiner

*Primary Examiner*—David A. Scherbel
*Assistant Examiner*—James S. Hogan
(74) *Attorney, Agent, or Firm*—Kenneth L. Green; Edgar W. Averill, Jr.

(57) ABSTRACT

A sprinkler circuit responds to the presence of water and limits watering accordingly. The sprinkler circuit comprises a control circuit and a moisture responsive circuit. The control circuit may be wired in series to a sprinkler cable at any point between a sprinkler controller (e.g., timer) and a sprinkler valve, and is powered by a valve signal sent from the sprinkler controller to the valve. The moisture responsive circuit includes two pairs of electrodes wired in series and residing at different depths. When resistance across both pairs of electrodes drops sufficiently, a relay in the control circuit opens and interrupts the valve signal to the valve.

21 Claims, 11 Drawing Sheets

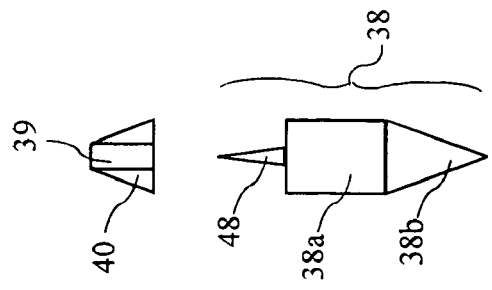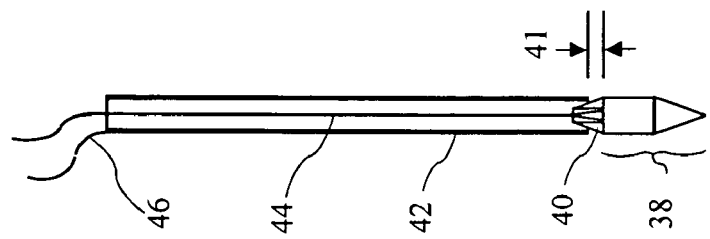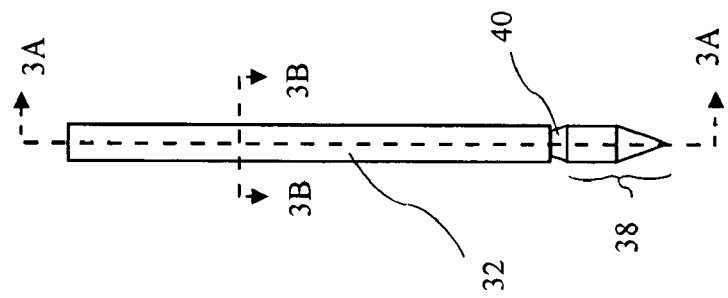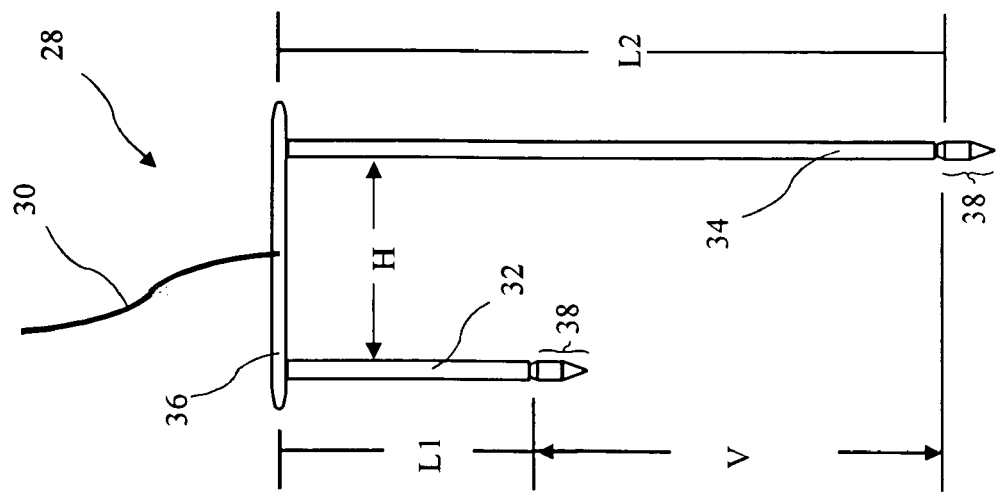

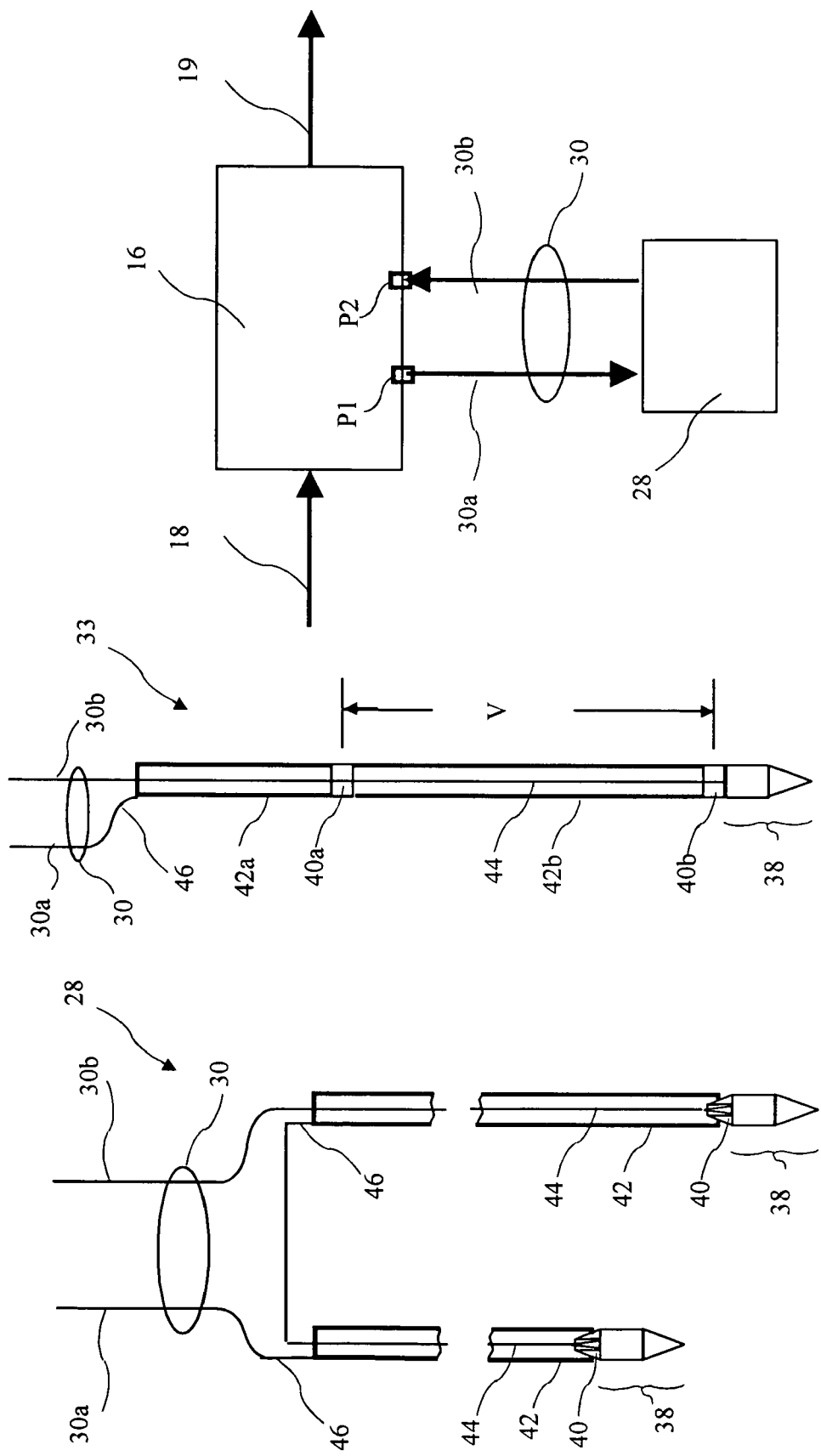

MOISTURE RESPONSIVE SPRINKLER CIRCUIT

BACKGROUND OF THE INVENTION

The present invention relates to controlling a sprinkler system based on ground moisture content, and in particular to a novel moisture responsive circuit and novel control circuit for efficiently controlling watering.

The use, and over use of water has become of critical importance in much of the Western United States, and in many parts of the world. Often, the ability to produce food is more dependent upon the availability of water for irrigation than on any other parameter. As populations grow, the situation will only become more difficult, and in many cases, wars result from the competition for water sources.

One common frustration in water management is the frequent over use of water. It is common to see sprinkler systems running during or immediately after rain, resulting in the waste of large quantities of water. Systems have been developed to limit watering, but known systems either fail to provide useful control, or are prohibitively expensive for widespread use. Known moisture sensors fall into three classes: resistive; capacitive; and hybrid. Resistive sensors comprise two conductive probes separates by two to three inches of soil. When the soil is moist, the conductivity of the soil increases, and this increase in conductivity can be measured. Unfortunately, the change in conductivity varies substantially from one soil type to another. As a result, known systems using a resistive sensor may be inaccurate, or require extensive calibration.

Capacitive moisture sensors sense the dielectric property of soil, which dielectric property may also vary form one soil type to another. Hybrid sensors utilize the same physical phenomena as resistive and capacitive sensors, and thus have the came calibration issues.

United States Application No. 2003/0230638 published Dec. 18, 2003 for "Automatic control method and system for irrigation," describes a system including a multiplicity of Time Domain Reflectometry Sensors (TDRS) in independent communication with a control device which compares the moisture measurements at various locations under irrigation to stored data. Unfortunately, a system such as described in the '638 application is unacceptably complex and expensive for widespread use. The system requires connectivity between each sensor and a main controller, which may be impractical in many instances, for example, existing landscaping where concrete may prevent easy addition of wiring between each sensor and the system controller (e.g., timer).

U.S. Pat. No. 4,801,865 for "Moisture sensor probe with at least two groups of resistive arrays," describes a complex two dimensional (2D) array of conductors and resistors which provide a highly accurate measure of soil moisture content. The 2D array is connected to a system controller, and the moisture information is used to reduce water waste. While the array of the '865 patent may provide improved measurements, it at best provides information for one depth, and may not be practical to retrofit when access to the system controller is not readily accessible.

BRIEF SUMMARY OF THE INVENTION

The present invention addresses the above and other needs by providing a sprinkler circuit which responds to the presence of water and limits watering accordingly. The sprinkler circuit comprises a control circuit and a moisture responsive circuit. The control circuit may be wired in series to a sprinkler cable at any point between a sprinkler controller (e.g., timer) and a sprinkler valve, and is powered by a valve signal sent from the sprinkler controller to the valve. The moisture responsive circuit includes two pairs of electrodes wired in series and residing at different depths. When resistance across both pairs of electrodes drops sufficiently, a relay in the control circuit opens and interrupts the valve signal to the valve.

In accordance with one aspect of the invention, there is provided an irrigation system comprising a sprinkler controller and at least one sprinkler valve connected to the sprinkler controller by a sprinkler cable carrying a valve signal which turns on the valve. A control circuit is serially connected to the sprinkler cable between the sprinkler controller and the sprinkler valve, and a moisture responsive circuit is electrically connected between a first port and a second port of the control circuit. The control circuit is powered by the valve signal. The moisture responsive circuit includes a first pair of electrodes and a second pair of electrodes serially connected between the first port and the second port. A first resistance across the first pair of electrodes is reduced when the first pair of electrodes experiences water and a second resistance across the second pair of electrodes is reduced when the second pair of electrodes experiences water. The control circuit interrupts the valve signal to the sprinkler valve when the sum of the first resistance and the second resistance is below a resistance threshold.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 2 shows a moisture responsive circuit comprising two probes according to the present invention.

FIG. 3 shows detailed view of a short probe according to the present invention.

FIG. 3A shows a cross-sectional view of the short probe taken along line 3A—3A of FIG. 3.

FIG. 3B shows a cross-sectional view of the short probe taken along line 3B—3B of FIG. 3.

FIG. 4 is a detailed view of a tip electrode and an insulator according to the present invention.

FIG. 5A depicts the short probe and the long probe electrically connected in-series.

FIG. 5B depicts a single probe embodiment of the moisture responsive circuit having two vertically spaced apart pair of electrodes electrically connected in-series.

FIG. 6 depicts the attachment of the moisture responsive circuit to a control circuit.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
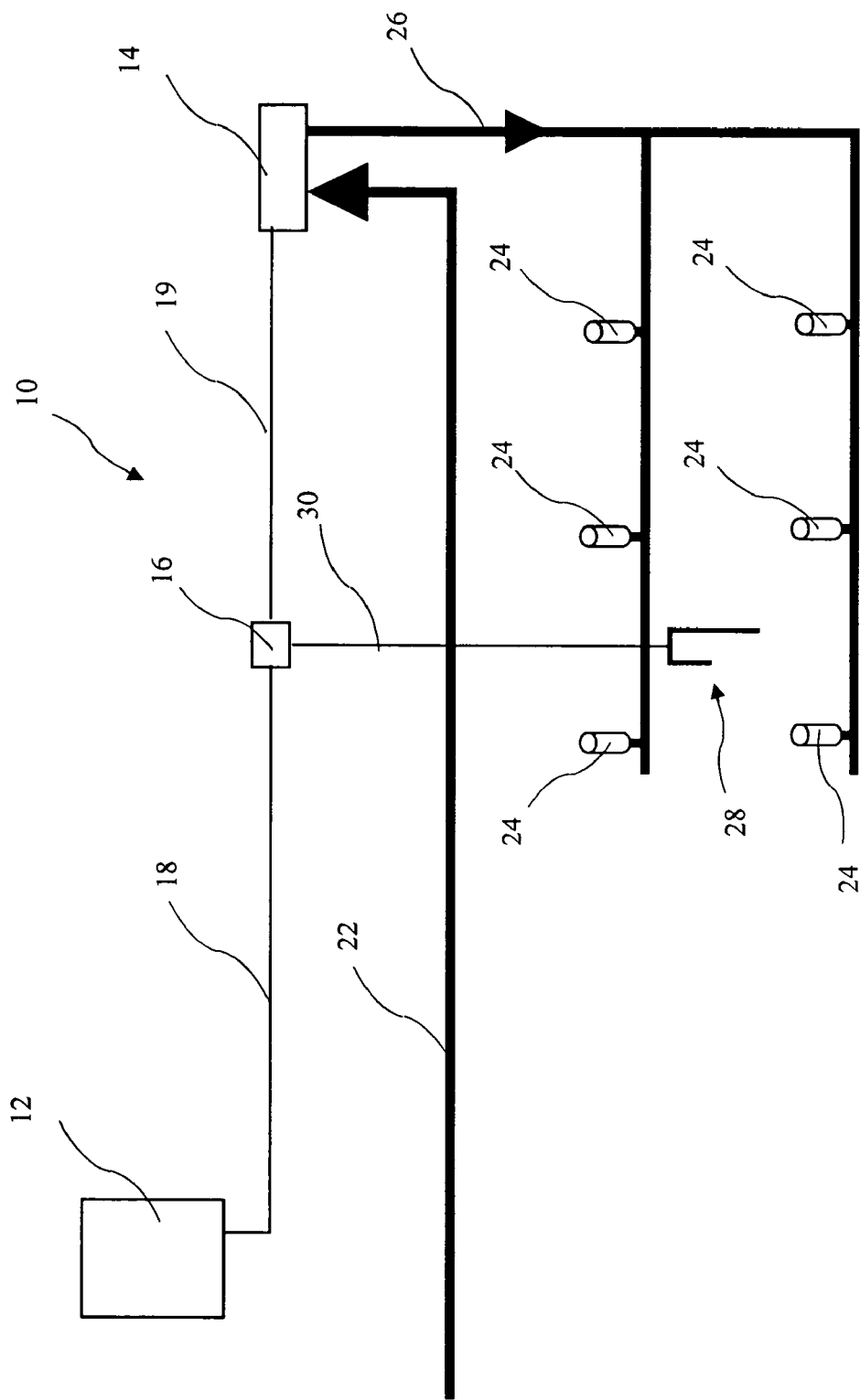
FIG. 1 is a sprinkler system including a control circuit and a moisture responsive circuit according to the present invention.

The present invention provides a simple and effective system for preventing over watering or under watering. A sprinkler system 10 including a sprinkler controller 12, at least one sprinkler valve 14, and a sprinkler cable comprising first sprinkler cable 18 and second sprinkler cable 19, is shown in FIG. 1. A water line 22 provides water to the sprinkler valve 14, and a sprinkler line 26 carries water from the sprinkler valve 14 to sprinklers 24. The sprinkler system 10 further includes a control circuit 16 connected to a moisture responsive circuit 28 by a circuit cable 30. The control circuit 16 is serially electrically connected between the sprinkler controller 12 and the sprinkler valve 14, wherein the control circuit 16 is connected in-series between the sprinkler cable 18 and the sprinkler cable 19.

The sprinkler controller 12 may, for example, provide a 24 volt Alternating Current (AC) valve signal S1 (see FIG. 7) to the sprinkler valve 14. The valve signal S1 is a power signal which causes the sprinkler valve 14 to open. The control circuit 16 receives the valve signal S1 over the sprinkler cable 18, and is both powered by the valve signal S1, and controllably passes a second valve signal S1' on to the sprinkler valve 14 over the sprinkler cable 19. The sprinkler controller 12 is generally a common timer, but may be any suitable source for the valve signal S1, for example, the sprinkler controller 12 may be a 24 Volt AC (VAC) transformer, and the control circuit 16 may be the only controlling device in the sprinkler system 10, wherein the sprinkler valve 14 is turned off when the moisture responsive circuit experiences water, and on otherwise. A timer may be preferred if the operation of multiple valves at the same time results in too low of a water pressure. However, low water pressure during concurrent valve operation may be handled by allowing control circuits 16 to communicate with each other.

A detailed view of an embodiment of the moisture responsive circuit 28 is shown in FIG. 2. The moisture responsive circuit 28 comprises a short probe 32 having length L1 and a long probe 34 having length L2, which are connected by a probe connector 36 which established a horizontal separation H of the short probe 32 and the long probe 34. Such configuration is called a "pegleg" configuration. An electrode pair is provided at the bottom of each probe 32, 34 by the cooperation of a conductive outer tube 42 (see FIG. 3A), and a tip electrode 38. The electrodes on the short probe 32 and the long probe 34 (specifically, the electrode gaps 41 in FIG. 3A) are vertically separated by a vertical distance V. The short probe 32 preferably extends to just above the plant root line, and the long probe 34 preferably extends to just below the root line. The short probe 32 and the long probe 34 may also be used without a probe connector 36. The preferred lengths L1 and L2 may vary depending on soil type and plant type. One preferred pair of lengths is the length L1 is between two inches and five inches, and the length L2 is between five inches and ten inches, and more preferably that the length L1 is approximately three inches and the length L2 is approximately seven inches, which lengths are an approximate match to the extent of the root line for some common types of grass. Alternatively, the lengths L1 and L2 may be relative lengths, and the vertical distance V may be the design specification, wherein V is preferably between two inches and twelve inches, and more preferably, V is approximately four inches. The horizontal separation H is preferably between one inch and five inches, and more preferably approximately three inches.

A more detailed view of the long probe 34 is provided in FIG. 3. A cross-sectional view of the short probe 32 taken along line 3A—3A of FIG. 3 is shown in FIG. 3A. An insulator 40 resides between the conductive tube 42 and tip electrode 38 to create an electrode gap 41. The electrode gap is preferably between 1/16 inches and 1/8 inches wide, and more preferably approximately 3/32 inches wide. An inner lead 44 is electrically connected to the tip electrode 38, and an outer lead 46 is electrically connected to the conductive tube 42. The lead 44 is preferably insulated to prevent shorting, for example, shorting between the inner lead 44 and the interior of the conductive tube 42. A cross-sectional view of the short probe 32 taken along line 3B—3B of FIG. 3 is shown in FIG. 3B, showing the inner lead 44 and conductive tube 42. The conductive tube 42 is preferably round, and preferably between 1/8 and 1/2 inches in diameter, and more preferably approximately 3/16 inches in diameter, and preferably has between 0.014 inches and 0.035 inches wall thickness. The conductive tube 42 is preferably made from an electrically conductive and corrosion resistant material, and more preferably from a copper alloy, an aluminum alloy, or stainless steel, and most preferably, the conductive tube 42 is made from stainless steel (e.g., stainless steel alloy 304 or 316.)

A detailed view of the tip electrode 38 and insulator 40 is shown in FIG. 4. The tip electrode 38 preferably has a central cylindrical portion 38a, a downward pointing conical portion 38b, and an upward pointing electrode connector 48. The cylindrical portion 38a is preferably the same diameter as the conductive tube 42 (see FIG. 3A) and more preferably is approximately 3/16 inches in diameter and approximately 1/4 inches long. The conical portion 38b preferably has a base the same diameter as the conductive tube 42 (see FIG. 3A) and more preferably has a base between approximately 3/16 inches in diameter and approximately 1/4 inches long. The electrode connector 48 preferably is approximately 1/4 inches high, and is conical with an approximately 1/8 inch diameter base. The inner lead 44 (see FIG. 3A) is electrically connected to the electrode connector, preferably by soldering. The tip electrodes 38 is preferably made from an electrically conductive and corrosion resistant material, and more preferably from a copper alloy, an aluminum alloy, or stainless steel, and most preferably, the tip electrodes 38 are made from stainless steel (e.g., stainless steel alloy 304 or 316.)

The insulator 40 is a truncated cone with a passage 39 through the center which the electrode connector 48 passes through. The base of the insulator 40 is preferably round, and preferably between 3/16 and 1/4 inches in diameter, and more preferably approximately 3/16 inches in diameter, or alternatively, the insulator 40 base diameter is preferably approximately the same diameter as the conductive tube 42. The insulator 40 is approximately 1/4 inches high. The passage 39 preferably has approximately 1/8 inch inside diameter. The insulator 40 is preferably made from an electrically insulating material, and more preferably from nylon.

While a preferred embodiment has been described above, a probe according to the present invention may be constructed in a variety of forms. For example, the electrode gap 41 may be formed in the horizontal dimension versus the vertical dimension as described above, or may be diagonal. Any moisture responsive circuit with at least two pairs of electrodes preferably having electrode gaps between 1/16 inches and 1/8 inches wide, which pairs of electrodes are electric connected in series and spaced apart vertically, is intended to come within the scope of the present invention.

The moisture responsive circuit 28 comprises the short probe 32 and the long probe 34 wired in series as shown in FIG. 5A. For example, the outer lead 46 of the short probe 32 may be electrically connected to a first conductor 30*a* of the circuit cable 30, the inner lead 44 of the short probe 32 may be electrically connected to the outer lead 46 of the long probe 34, and the inner lead 44 of the long probe 34 may be electrically connected to a second conductor 30*b* of the circuit cable 30. The circuit cable 30 thus connects the moisture sensitive circuit 28 to the control circuit as shown in FIG. 6. While a specific embodiment is described herein, any combination of outer leads and inner leads that results in an in-series electrical connection of at least two pairs of vertically spaced apart electrodes, between the conductors 30*a*, 30*b*, is intended to come within the scope of the present invention.

A second embodiment of a moisture responsive circuit 28*b* is shown in FIG. 5B comprising a single probe 33. The probe 33 comprises an upper conductive tube 42*a*, an upper insulator/spacer 40*a*, a lower conductive tube 42*b*, a lower upper insulator/spacer 40*b*, and the tip electrode 38. The inner lead 44 is electrically connected between the tip insulator 38 and second conductor 30*b* of the circuit cable 30. The conductor 30*a* of the circuit cable 30 is electrically to the upper conductive tube 42*a*. The insulators 40*a*, 40*b* create electrode gaps corresponding to the gap 41 in FIG. 3A. The insulators 40*a*, 40*b* are preferably made from an electrically insulating material, and more preferably from nylon. The electrode gaps are preferably between 1/16 inches and 1/8 inches wide, and more preferably approximately 3/32 inches wide. The vertical spacing V between gaps is preferably between two inches and twelve inches, and more preferably, V is approximately four inches.

Figure 7:
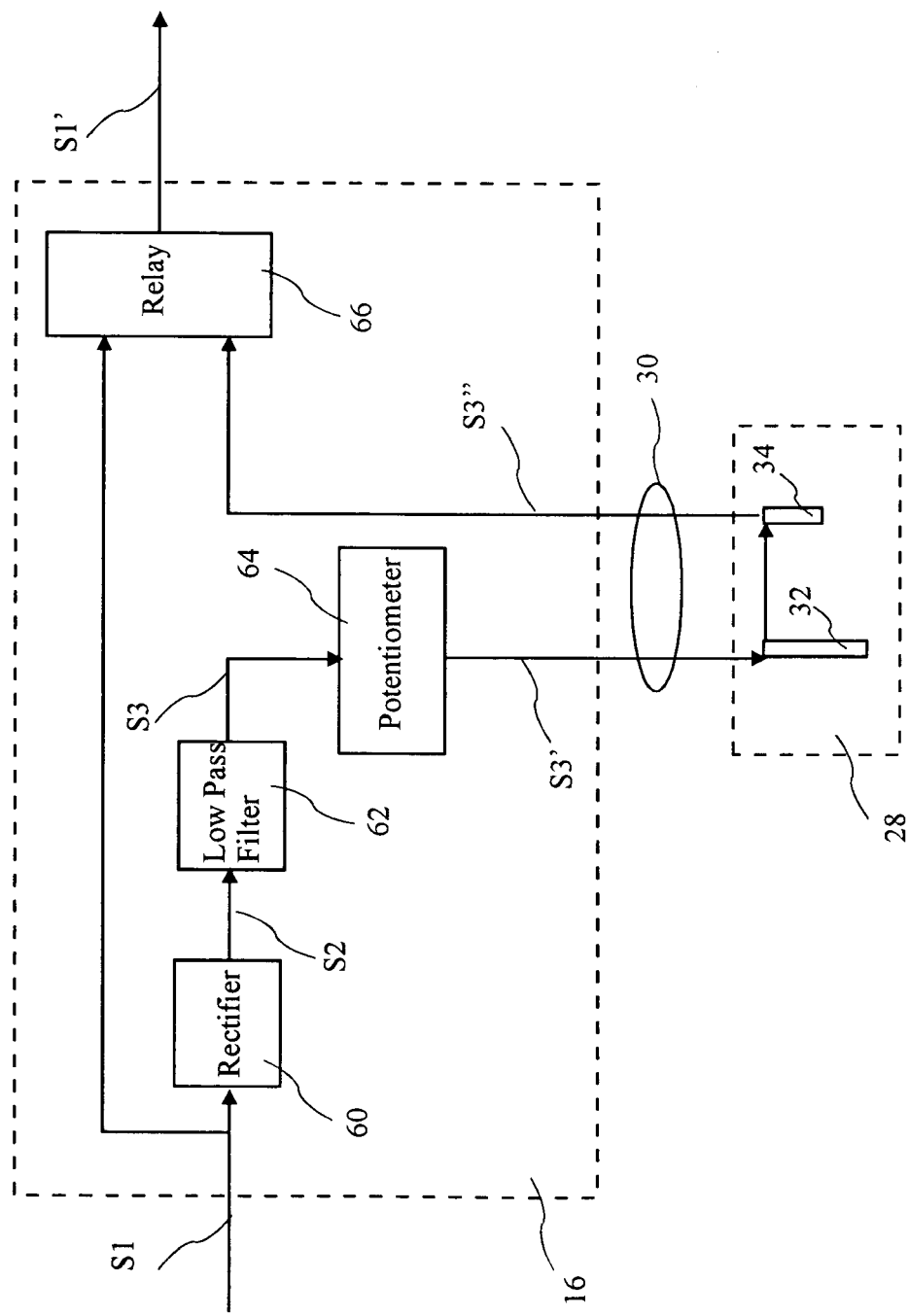
FIG. 7 shows a flow chart of signals and processing elements present in the control circuit and the moisture responsive circuit.

A flow chart of the control circuit 16 is shown in FIG. 7. An input signal S1 is typically the valve signal (i.e., a power signal or a line signal) generated by the sprinkler controller 12 (see FIG. 1). The signal S1 is provided both to a rectifier 60 and a relay 66, which rectifier 60 is preferably a 100 volt, 10 amp max, rectifier. The rectifier 60 generates a rectified signal S2 from the signal S1, and provides the signal S2 to a low pass filter 62. The filter 62 generates a filtered signal S3 from the signal S2 to reduce high frequency components of the signal, and provides the signal S3 to a potentiometer 64. The filtered signal S3 is a pseudo Direct Current (DC) signal suitable for energizing the relay 66. In cases where the valve signal S1 is a DC signal, a control circuit excluding a rectifier 60 and filter 62 could be utilized, however the presence of a rectifier 60 and filter 62 do not effect the control circuit performance when the valve signal S1 is a DC signal. The purpose of the potentiometer 64 is to tune the control circuit 16 to a variety of circuit cable 30 lengths (adjustable during manufacturing) or to adjust the control circuit 16 for soil type (adjusted by a user). The potentiometer 64 generates a first attenuated filtered signal S3' and provides the signal S3' to the in-series probes 32 and 34. The in-series probes 32 and 34 generate a second attenuated filtered signal S3" and provide the signal S3" to the relay 66, which is preferably a Single Pole Double Throw (SPDT) relay. If the signal S3" is weak, the relay 66 is un-energized, and an output signal S1' is representative of the signal S1. If the signal S3" is sufficiently strong, the relay 66 is energized, and the output signal S1' is zeroed (i.e., the sprinkler valve 14 is disconnected from the input signal S1).

Figure 7A:
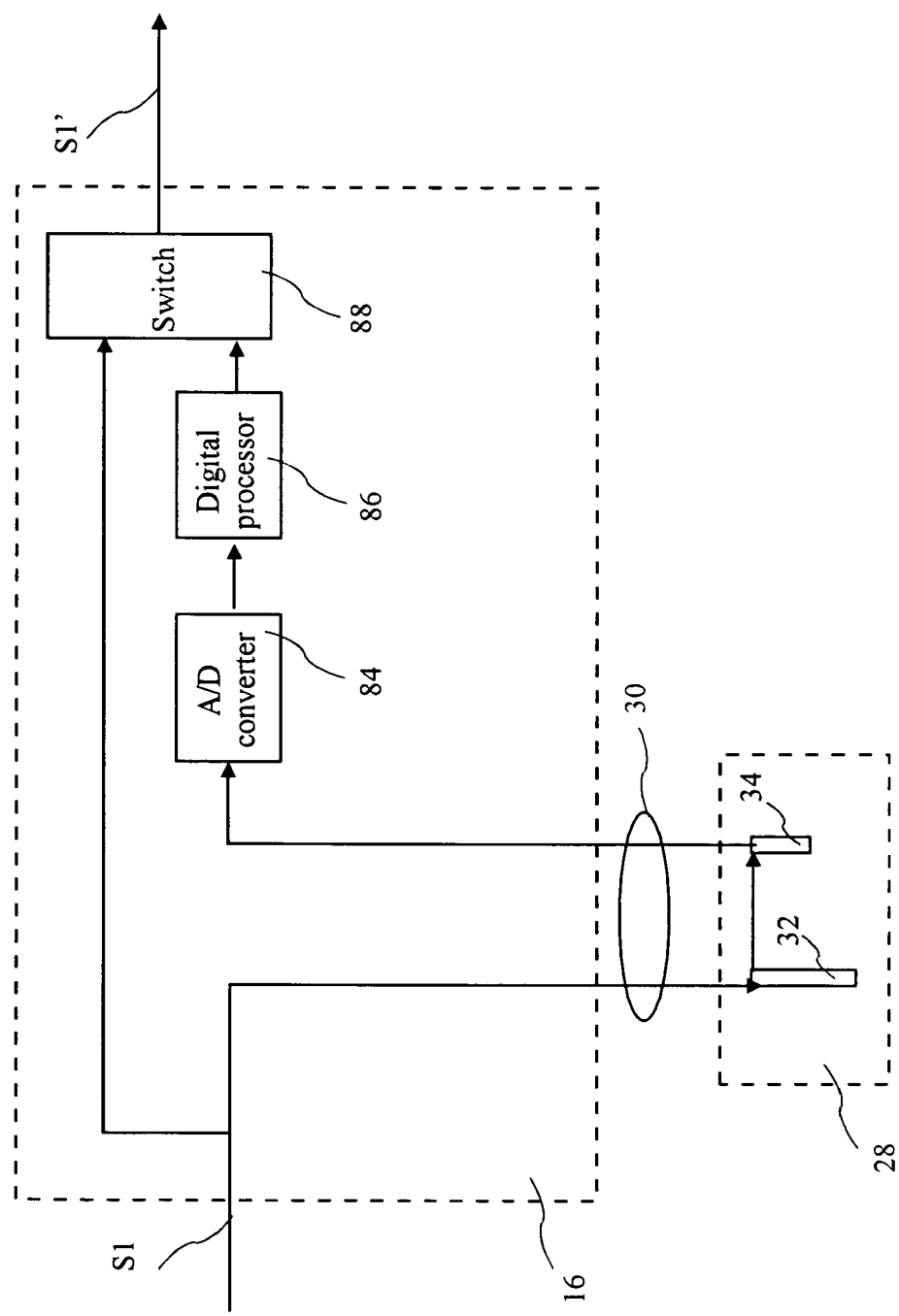
FIG. 7A describes a digital embodiment of the sprinkler control system.

A digital embodiment of the present invention is shown in FIG. 7A. The valve signal S1 is provided to moisture responsive circuit 28 and to a switch 88. The signal from the moisture responsive circuit 28 is processed by an A/D converter 84 to generate a representative digital signal. A digital processor 86 processes the digital signal to generate a switch signal to turn switch 88 on or off, and thereby control the transmission of the valve signal S1' to the sprinkler valve.

Figure 8:
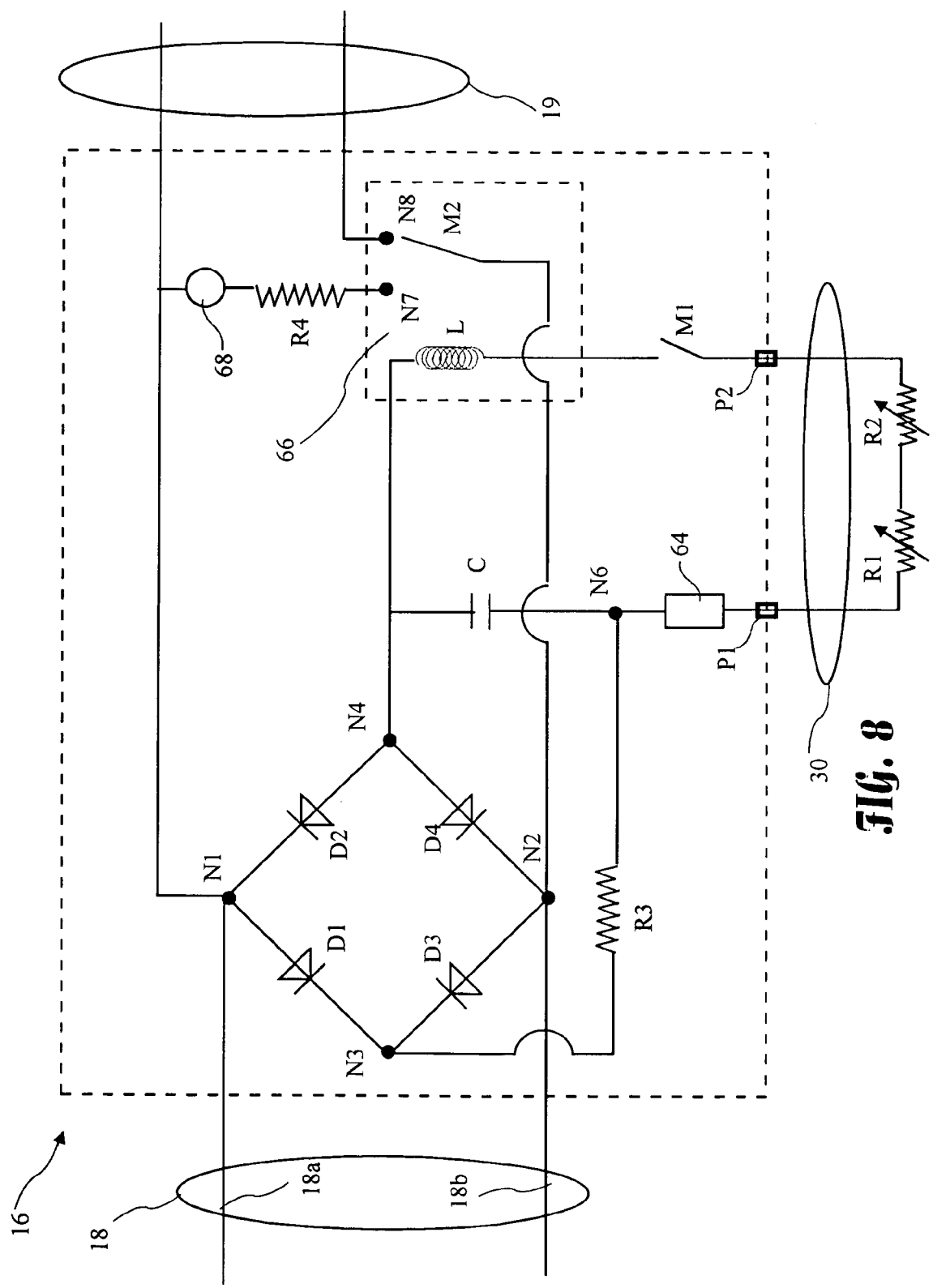
FIG. 8 is a detailed circuit diagram of the control circuit and the moisture responsive circuit.

A detailed circuit diagram for the control circuit 16 is shown in FIG. 8. The rectifier 60 is shown to comprise four diodes D1, D2, D3, and D4 separated by four nodes N1, N2, N3, and N4, wherein nodes N1 and N2 are input nodes, and nodes N3 and N4 are output nodes. The sprinkler cable 18 comprises a first conductor 18*a* and a second conductor 18*b*. The conductor 18*a* is connected to the node N1 and the conductor 18*b* is connected to the node N2. The node N3 is connected to a resistor R3 preferably having approximately 1000 ohms resistance, and the N4 is connected to a capacitor C preferably having approximately 22 μf capacitance. The capacitor C and resistor R3 are both electrically connected to node N6. The values provided for the resistance of the resister R3 and the capacitance of the capacitor C are examples only. Any combination of resistor R3 and capacitor C which suitable condition the rectified signal S2 to reliably energize the relay 66 are intended to come within the scope of the present invention, as is any circuit suitable to condition the rectified signal S2 to reliably energize the relay 66.

Continuing with FIG. 8, the node N6 is connected to a first port P1 through the potentiometer 64. The probes 32, 34 represented by variable resistances R1 and R1 are connected between the port P1 and a second port P2. The port P2 is connected to coil L through a manual override switch M1, the coil L residing in the relay 66. The output node N4 is connected to the opposite side of the coil L. The low pass filter 62 (see FIG. 7) formed by the capacitor C and the resister R3 is present to sufficiently filter the signal S2 to remove oscillations in order to reliably energize the relay 66. A control circuit including any filter providing sufficient filtering to energize the relay 66 is intended to come within the scope of the present invention, and a control circuit 16 including a relay 66 not requiring a filtered signal is intended to come within the scope of the present invention.

Operation of the relay 66 is depicted by the position of a second switch M2. The sprinkler cable 18 is connected to the sprinkler cable 19 across the relay 66, wherein the sprinkler cable 19 is electrically connected to the sprinkler cable 18 when then the relay 66 is in the un-energized state (the switch M2 connected to the node N8), and the sprinkler cable 19 is electrically disconnected from the sprinkler cable 18 when then the relay 66 is in the energized state (the switch M2 connected to the node N7). The node N7 is connected to the node N1 through a fourth resister R4 and an LED 68, wherein the LED 68 lights when the relay is in the energized state (i.e., when the control circuit 16 disconnects the sprinkler valve 14 from the sprinkler controller 12.)

Figure 9:
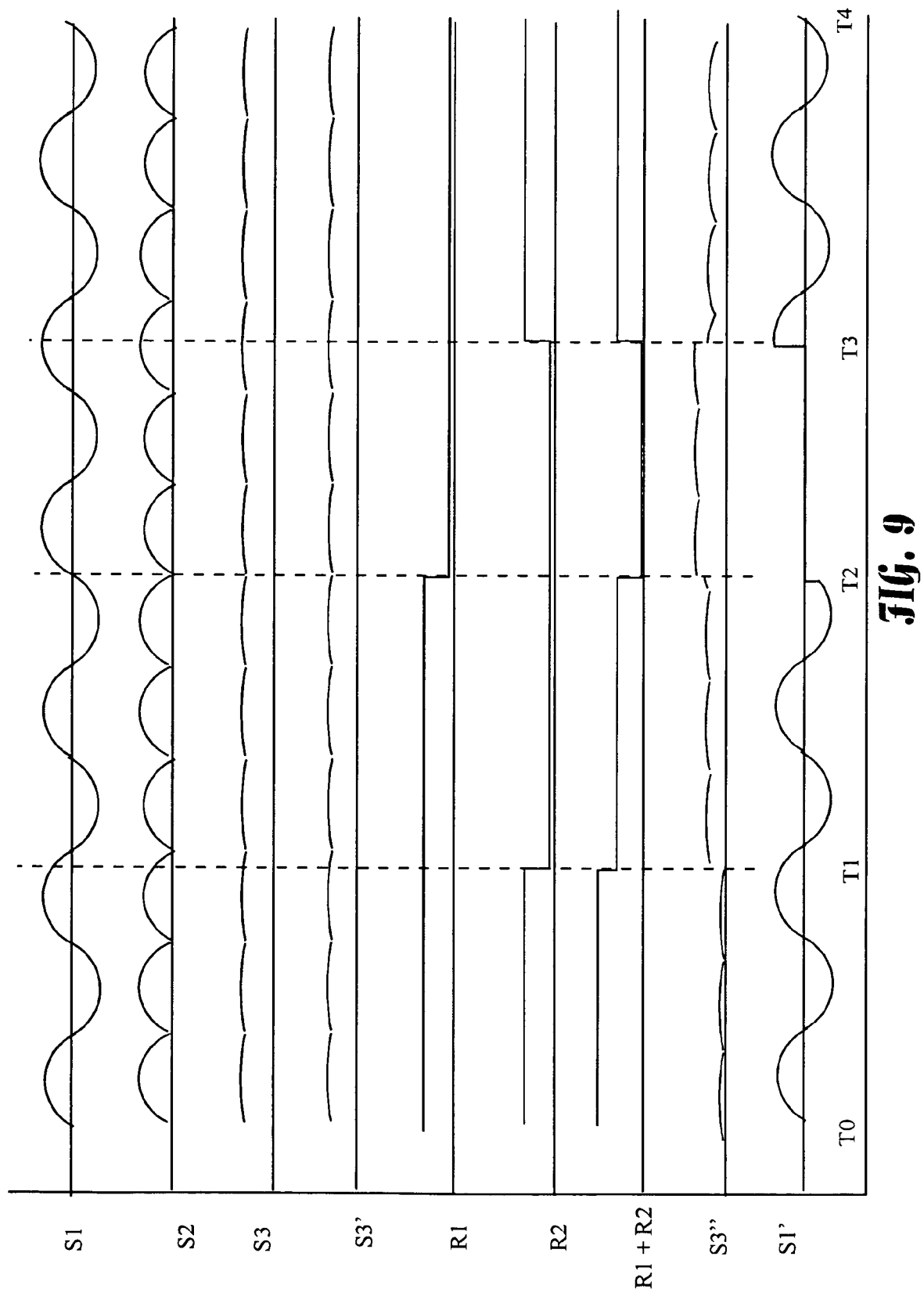
FIG. 9 depicts the relative behavior of the signals present in the control circuit and the moisture responsive circuit.

The operation of the present invention may further be described in terms of the values of the signals present in the control circuit 16 as shown in FIG. 9. The signals are described in FIG. 7. The input signal S1 represents a typical valve signal, for example, a 24 volt AC power signal. The signal S2 represents a rectified version of the signal S1. The signal S3 represents a filtered version of the rectified signal S2. The signal S3' represents an attenuated version of the signal S3 following attenuation by the potentiometer 64. The potentiometer R4 may be adjusted during manufacturing to adjust the control circuit 16 for the resistance of the circuit cable 30 and/or the moisture responsive circuit 28, or the potentiometer R4 may be adjusted by a user to tune the system to a particular soil type or moisture responsive circuit 28 placement. R1 and R2 represent resistances associated with the flow of current between the conductive tubes 42 and the tip electrodes 34 (i.e., across the electrode gaps.) The signal S3" is generated by the attenuation the signal S3' by the moisture responsive circuit 28 (i.e., a reduced voltage version of S3' due to the voltage drops across R1 and R2). The signal S1' represents the power signal (i.e., valve signal) sent from the control circuit 16 to the sprinkler valve 14.

The signals represented in FIG. 9 are consistent with a sprinkler system 10 having an AC valve signal S1. The present invention is also applicable to a sprinkler system having a Direct Current (DC) valve signal. In the case of a DC valve signal, the signal S1 is a simple DC constant voltage, the rectified signal S2 and the filtered signal S3 are substantially identical to S1 (i.e., may slightly vary due to the presence of the rectifier 60 and low pass filter 62 (see FIG. 7)). The present invention is thus intended to encompass any sprinkler control system having a control circuit serially electrically connected between a sprinkler valve signal source and a sprinkler valve, which control circuit is powered by the valve signal.

An alternative embodiment of the present invention may include an AC relay. Such alternative control circuit does not require the rectifier and filter described above, and a moisture control system according to the present invention including such alternative control circuit is intended to come within the scope of the present invention.

The following description is an example of events which could take place in an irrigation system including the control circuit 16 and moisture responsive circuit 28. Initially, tip electrodes 34 of both probes 32, 43 (see FIG. 7) are dry, the resistances R1 and R2 are high, the relay 66 is un-energized, and the output signal S1' is representative of the input signal S1. When moisture reaches the tip electrode 38 of the short probe 32 at time T1, R1 drops, but R2 remains high. The sum of R1+R2 remains high, and the signal S3" remains low (below the level required to energize the relay 66.) At time T2, the moisture reaches the tip electrode 34 of the long probe 34, and R2 drops. Now, the sum R1+R2 is low, and the signal S3" is sufficient to energize the relay 66, thereby zeroing the output signal S1' to the sprinkler valve 14. At time T3, the moisture is no longer experienced by the tip electrode 34 of the short probe 32, and the sum R1+R2 increases such that the signal S3" is reduced below the activation level for the relay 66. As a result, the output signal S1' is again representative of the input signal S1.

Figure 10:
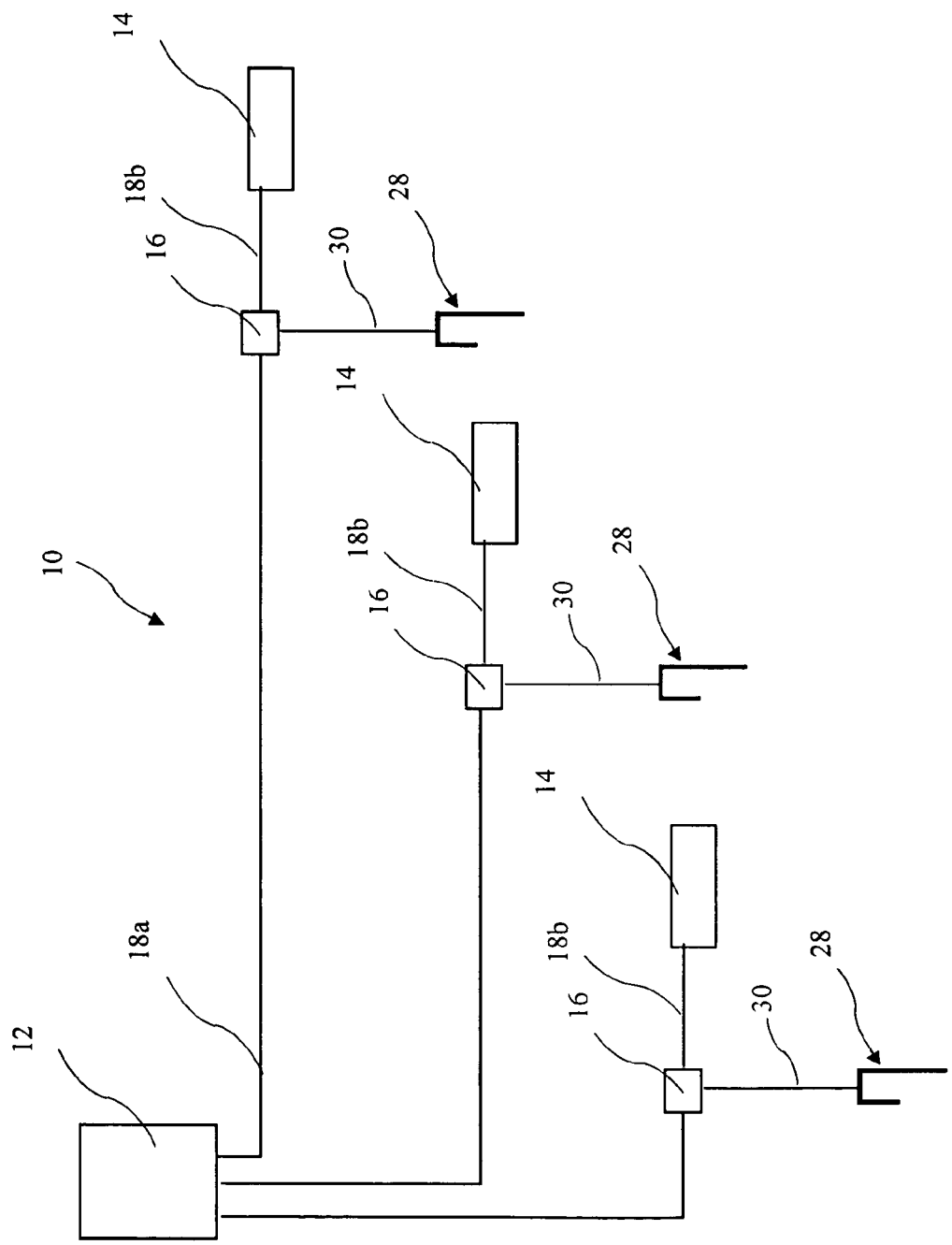
FIG. 10 depicts sprinkler system with a multiplicity of control circuits and moisture responsive circuits.

Generally, sprinkler systems include a multiplicity of sprinkler valves. An example of a sprinkler system with three sprinkler valves 14, three control circuits 16, and three moisture responsive circuits 28 is shown in FIG. 10. In this example, the areas watered by each sprinkler valve may be independently monitored for moisture.

Figure 11:
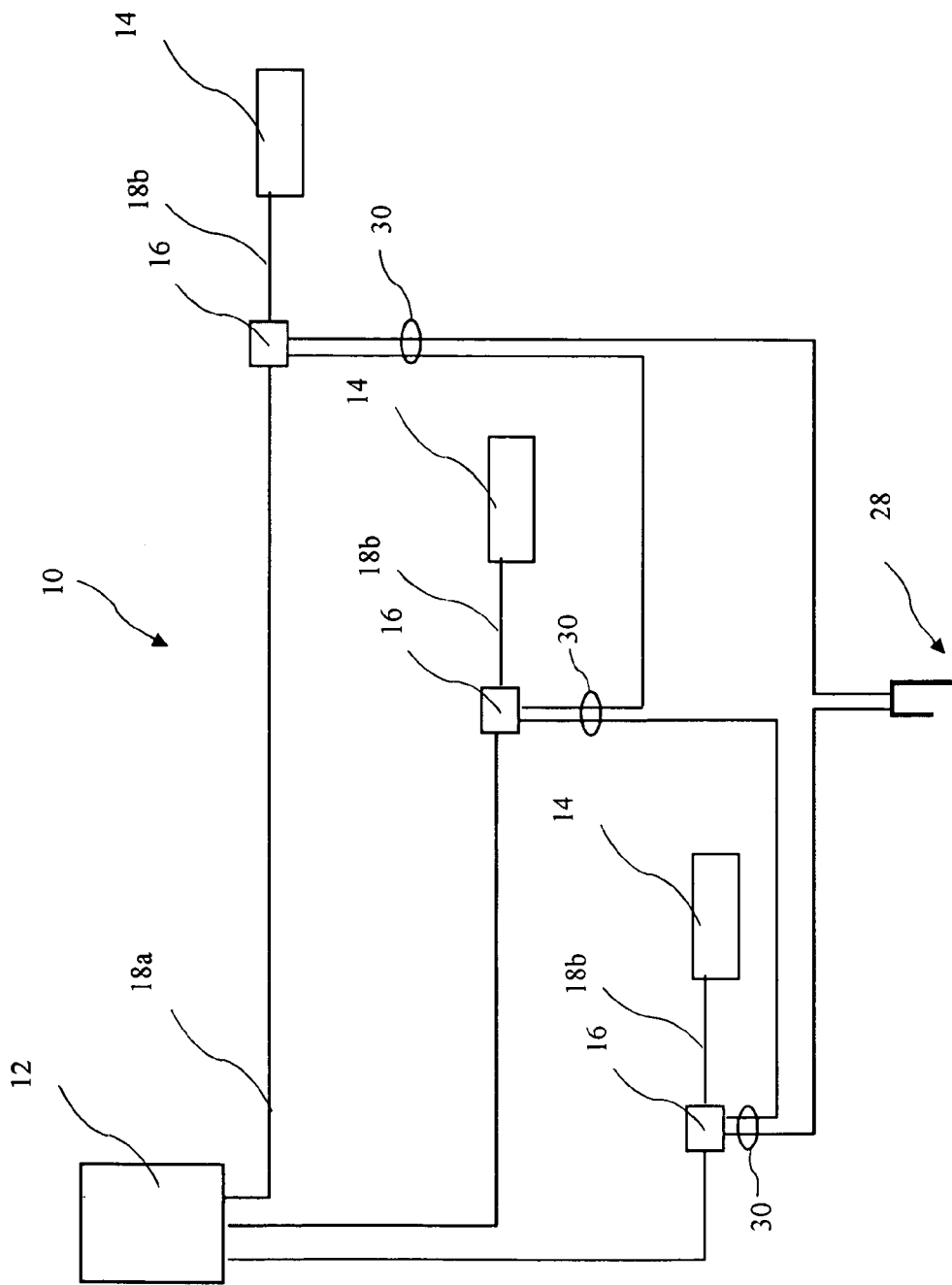
FIG. 11 depicts a sprinkler system with a multiplicity of control circuits and a single moisture responsive circuit.

In another example depicted in FIG. 11, three control circuits 16, and single moisture responsive circuit 28 cooperate with three sprinkler valves 14. In this instance, The single moisture responsive circuit 28 is wired in-series with the first and second ports P1, P2 of the three control circuits 16. This embodiment is particularly suitable for shutting off an entire sprinkler system during rain, when a single moisture responsive circuit is adequate to react to the presence of moisture for the entire sprinkler system.

Figure 12:
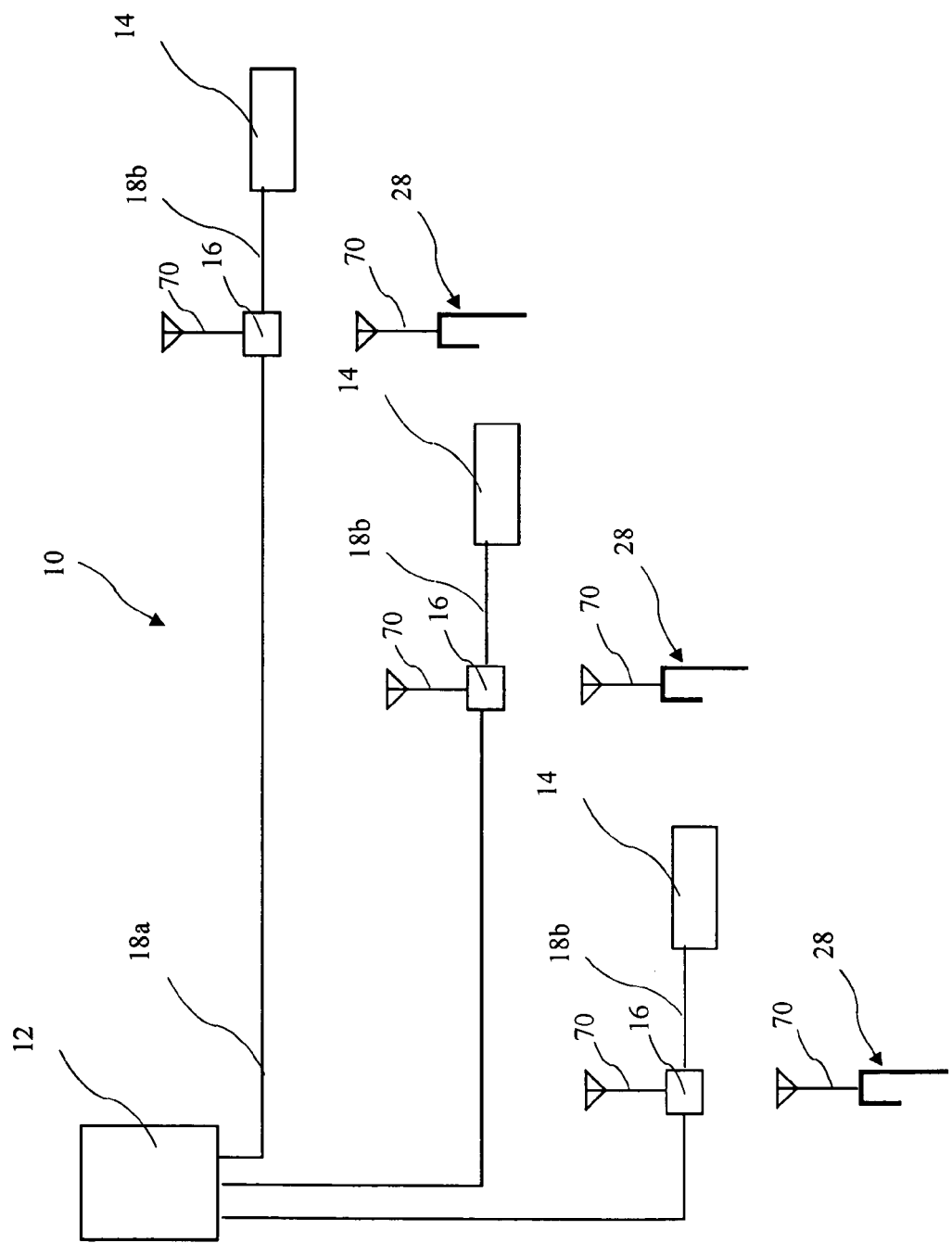
FIG. 12 depicts a sprinkler system with a multiplicity of wireless control circuits and wireless moisture responsive circuit.

The present invention may further have a wireless connection between the control circuit(s) 16 and the moisture responsive circuit(s) 28 as shown in FIG. 12. In this embodiment, both the control circuit(s) 16 and the moisture responsive circuit(s) 28 include antennas 70.

Figure 13:
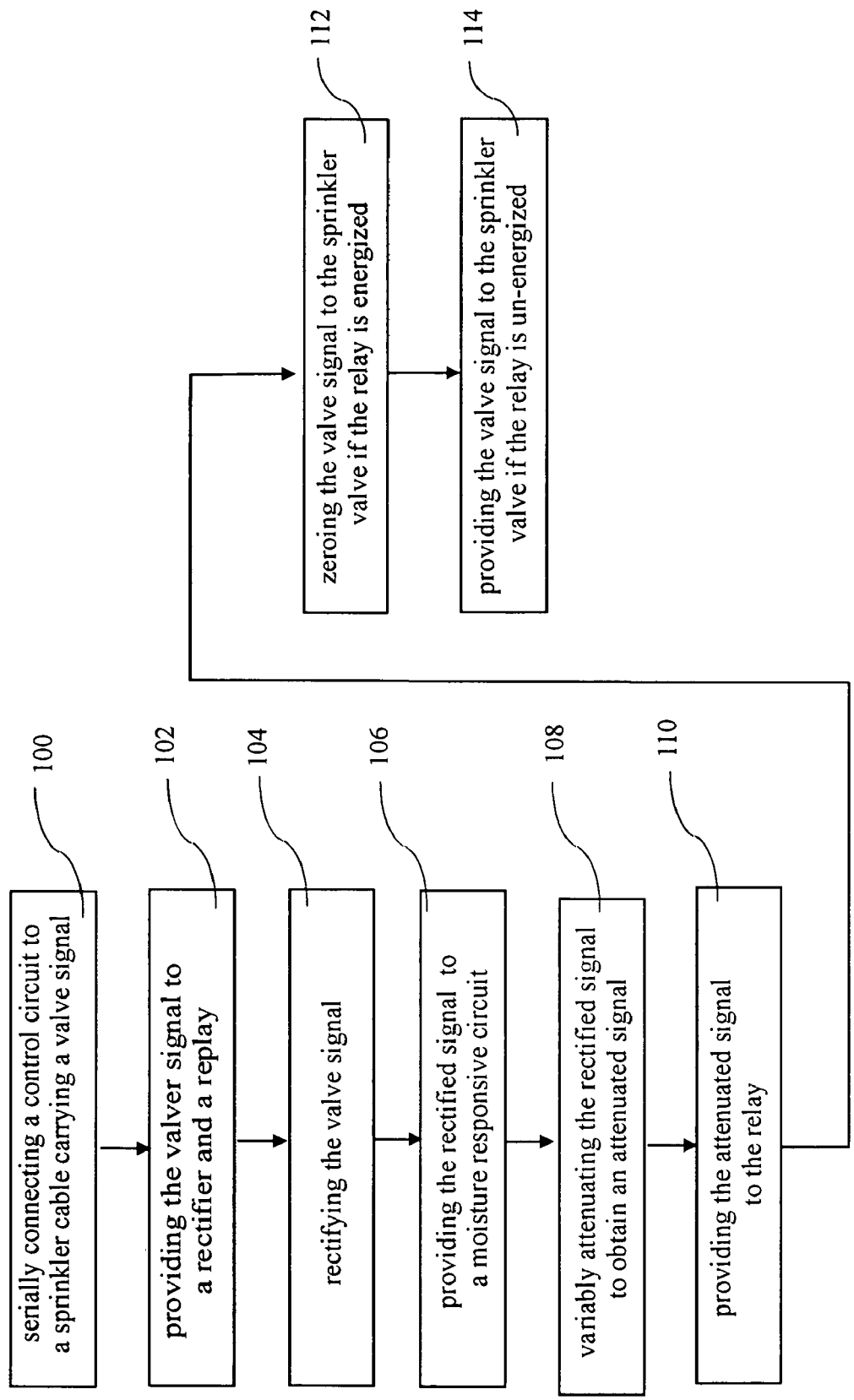
FIG. 13 is a method for providing an irrigation system according to the present invention.

A method for controlling a sprinkler system is shown in FIG. 13. A control circuit 16 is serially connected to a sprinkler cable carrying a valve signal to a sprinkler valve 14 at step 100. The valve signal is provided to a rectifier and to a relay at step 102. The valve signal is rectified to generate a rectified signal at step 104. The rectified signal from the control circuit is provided to a moisture responsive circuit at step 106. The rectified signal is variably attenuated by the moisture responsive circuit to obtain an attenuated signal, wherein the amount of attenuation depends on the amount of water experienced by the moisture responsive circuit, at step 108. The attenuated signal from the moisture responsive circuit is provided to the relay at step 110. The valve signal is zeroed to the sprinkler valve through the relay, if the relay is energized at step 112. The valve signal is provided to the sprinkler valve through the relay, if the relay is un-energized at step 114.

An additional step of filtering the rectified signal may be included to reliably energize the relay 66. Another additional step of adjusting the potentiometer 64 to tune the control circuit may be included between the rectifying step 104 and the providing step 106.

Both a novel control circuit 16, and a novel moisture responsive circuit 28 have been described above. The control circuit 16 does not require an independent power source, and may be wired in-series at any point between a sprinkler controller and a sprinkler valve. The moisture responsive circuit combines two in-series moisture responsive elements, which uniquely responds to the presence of moisture at two depths, and avoids the complexity of known moisture monitoring irrigation systems. The combination of the control circuit 16 and the moisture sensitive circuit 28 thus provides a simple and effective system for controlling an irrigation system in response to moisture in the ground. The circuit is thus simple, inexpensive, and easy to install in existing sprinkler systems. The circuit is suited for both commercial and residential use, and due to the low cost and simple installation, is ideal for home owners.

While the invention herein disclosed has been described by means of specific embodiments and applications thereof, numerous modifications and variations could be made thereto by those skilled in the art without departing from the scope of the invention set forth in the claims.

I claim:

1. A sprinkler circuit comprising:
   a control circuit electrically connectable in series to a sprinkler cable running between a sprinkler controller and a sprinkler valve; and
   a moisture responsive circuit electrically connected to the control circuit, the moisture responsive circuit comprising a first pair of electrodes and a second pair of electrodes serially connected, wherein the control circuit is powerable by a valve signal sent from the sprinkler controller to the sprinkler valve, and wherein the control circuit is adapted to interrupt the valve signal to the sprinkler valve when both the first pair of electrodes experience water and the second pair of electrodes experience water.

2. The sprinkler circuit of claim 1, wherein the control circuit includes a rectifier for rectifying the valve signal to generate a rectified signal.

3. The sprinkler circuit of claim 2, wherein the control circuit further includes a low pass filter to filter the rectified signal to generate a filtered signal with reduced high frequency components.

4. The sprinkler circuit of claim 3, wherein the control circuit provides the filtered signal to the moisture responsive circuit through a first port.

5. The sprinkler circuit of claim 4, wherein:
the moisture responsive circuit generates an attenuated signal by attenuating the filtered signal, wherein the attenuation is small when the moisture responsive circuit experiences water;
the attenuated signal is provided to a second port on the control circuit; and
the valve signal to the sprinkler valve is interrupted when the attenuated signal exceeds a threshold.

6. The sprinkler circuit of claim 5, wherein the second port is attached to a relay, and wherein the relay interrupts the valve signal to the sprinkler valve when the attenuated signal is sufficient to energize the relay.

7. The sprinkler circuit of claim 6, wherein the control circuit includes a manual switch (M) electrically connected between the second port and the relay, wherein opening the manual switch over rides the moisture responsive circuit.

8. The sprinkler circuit of claim 1, wherein the first pair of electrodes are separated by between 1/16 inches and 1/8 inches, and wherein the second pair of electrodes are separated by between 1/16 inches and 1/8 inches.

9. The sprinkler circuit of claim 1, wherein the first pair of electrodes are separated by approximately 3/32 inches, and wherein the second pair of electrodes are separated by approximately 3/32 inches.

10. The sprinkler circuit of claim 1, wherein the first pair of electrodes and the second pair of electrodes are made from one of a group consisting of copper alloy, aluminum alloy, and stainless steel.

11. The sprinkler circuit of claim 10, wherein the first pair of electrodes and the second pair of electrodes are made from stainless steel.

12. The sprinkler circuit of claim 1, wherein control circuit includes a Potentiometer (P) for adjusting the control circuit for various soil types and plant types.

13. The sprinkler circuit of claim 1, wherein the control circuit includes an AC relay for controlling the transmission of the valve signal to the sprinkler valve, and wherein the valve signal is attenuated by a potentiometer and provided from the potentiometer to the moisture responsive circuit and from the moisture responsive circuit to the AC relay.

14. The sprinkler circuit of claim 1, wherein the valve signal is a DC signal and wherein the control circuit includes a relay for controlling the transmission of the valve signal to the sprinkler valve, and wherein the valve signal is attenuated by a potentiometer and provided from the potentiometer to the moisture responsive circuit and from the moisture responsive circuit to the relay.

15. An irrigation system comprising:
at least one sprinkler valve;
a control circuit providing a valve signal to the sprinkler valve; and
a moisture responsive circuit electrically connected between a first port and a second port of the control circuit, the moisture responsive circuit including a first pair of electrodes and a second pair of electrodes serially connected between the first port and the second port, wherein a first resistance across the first pair of electrodes is reduced when the first pair of electrodes experiences water and a second resistance across the second pair of electrodes is reduced when the second pair of electrodes experiences water,
wherein the control circuit interrupts the valve signal to the sprinkler valve when the sum of the first resistance and the second resistance is below a resistance threshold.

16. The sprinkler circuit of claim 15 wherein:
the control circuit is electrically connected in series to a sprinkler cable running between a sprinkler controller and the sprinkler valve;
the valve signal is generated by the sprinkler controller; and
the control circuit is powered by the valve signal.

17. The sprinkler circuit of claim 15 wherein the first pair of electrodes and the second pair of electrodes are separated horizontally by between one inch and five inches.

18. The sprinkler circuit of claim 17 wherein the first pair of electrodes and the second pair of electrodes are separated horizontally by approximately three inches.

19. The sprinkler circuit of claim 15 wherein the first pair of electrodes and the second pair of electrodes are vertically separated by between two inches and twelve inches.

20. The sprinkler circuit of claim 19 wherein the first pair of electrodes and the second pair of electrodes are vertically separated by approximately four inches.

21. A method for controlling an irrigation system, the method comprising:
serially connecting a control circuit to a sprinkler cable carrying a valve signal to a sprinkler valve;
providing the valve signal to a rectifier and to a relay;
rectifying the valve signal in the control circuit to generate a rectified signal;
providing the rectified signal from the control circuit to a moisture responsive circuit;
variably attenuating the rectified signal in the moisture responsive circuit to obtain an attenuated signal, wherein the amount of attenuation depends on the amount of water experienced by the moisture responsive circuit;
providing the attenuated signal from the moisture responsive circuit to the relay in the control circuit, wherein the level of the attenuated signal determines if the relay is energized;
zeroing the valve signal to the sprinkler valve if the relay is energized; and
providing the valve signal to the sprinkler valve through the relay if the relay is un-energized.

* * * * *